US009485924B1

(12) United States Patent
Frye

(10) Patent No.: US 9,485,924 B1
(45) Date of Patent: Nov. 8, 2016

(54) PLANTING APPARATUS, SYSTEM, AND RELATED METHODS

(71) Applicant: Brenda B. Frye, Hollis, NH (US)

(72) Inventor: Brenda B. Frye, Hollis, NH (US)

(*) Notice: Subject to any disclaimer, the term of this patent is extended or adjusted under 35 U.S.C. 154(b) by 0 days.

(21) Appl. No.: 15/178,872

(22) Filed: Jun. 10, 2016

Related U.S. Application Data

(60) Provisional application No. 62/180,804, filed on Jun. 17, 2015.

(51) Int. Cl.
*A01G 31/00* (2006.01)
*A01G 27/06* (2006.01)
*A01G 31/02* (2006.01)
*A01G 1/00* (2006.01)

(52) U.S. Cl.
CPC ............. *A01G 27/06* (2013.01); *A01G 1/001* (2013.01); *A01G 31/02* (2013.01)

(58) Field of Classification Search
CPC ...... A01G 27/04; A01G 27/06; A01G 27/00; A01G 27/02; A01G 27/005
See application file for complete search history.

(56) References Cited

U.S. PATENT DOCUMENTS

| 2,722,779 | A | * | 11/1955 | Allderdice | A01G 27/00 47/64 |
| 4,287,682 | A | * | 9/1981 | Browne | A01G 27/04 47/65.8 |
| 4,299,054 | A | | 11/1981 | Ware | |
| 4,324,070 | A | * | 4/1982 | Swisher | A01G 27/04 47/81 |
| 4,339,891 | A | * | 7/1982 | Bassett | A01G 27/04 47/71 |
| 4,403,446 | A | | 9/1983 | Wolfe et al. | |
| 4,407,092 | A | | 10/1983 | Ware | |
| 5,588,255 | A | * | 12/1996 | Johnson | A01G 27/04 47/58.1 R |
| 6,006,472 | A | * | 12/1999 | Holtkamp, Jr. | A61L 9/127 47/79 |
| 6,079,156 | A | * | 6/2000 | Colovic | A01G 27/04 47/81 |
| 7,000,351 | B2 | * | 2/2006 | Baumann | A01G 27/04 47/32.7 |
| 9,161,500 | B2 | * | 10/2015 | Hansen | A01G 27/04 |
| 2004/0200142 | A1 | * | 10/2004 | Ito | A01G 9/02 47/41.14 |
| 2004/0237397 | A1 | | 12/2004 | Zintz | |
| 2007/0209279 | A1 | * | 9/2007 | Pasquariello | A01G 27/06 47/81 |
| 2009/0223124 | A1 | * | 9/2009 | Pasquariello | A01G 27/04 47/66.1 |
| 2009/0313892 | A1 | * | 12/2009 | Hashimoto | A01G 27/02 47/79 |
| 2012/0198767 | A1 | * | 8/2012 | Hansen | A01G 27/04 47/81 |
| 2013/0333780 | A1 | * | 12/2013 | Chan | A01G 27/04 137/561 R |
| 2015/0033625 | A1 | * | 2/2015 | Jawarski | A01G 27/02 47/79 |
| 2016/0050861 | A1 | * | 2/2016 | Abbott | A01G 27/04 47/81 |

OTHER PUBLICATIONS

Modern Sprout—Hydroponic Planters and Indoor Gardening Kits, 2015, ModernSprout, http://www.modsprout.com/.

* cited by examiner

*Primary Examiner* — Kristen C Hayes
(74) *Attorney, Agent, or Firm* — Hayes Soloway P.C.

(57) ABSTRACT

A planting apparatus and related methods and systems are disclosed. The planting apparatus includes a first container holding a quantity of liquid. A second container is positioned above the first container, the second container having a hole positioned in a lower portion thereof. A filter container is positioned on the second container, the filter container having at least one of: a seed and a plant. A wicking material is positioned between the filter container and the second container, through the hole in the lower portion of the second container, and into the first container, wherein the wicking material is in contact with the quantity of liquid.

19 Claims, 9 Drawing Sheets

PLANTING APPARATUS, SYSTEM, AND RELATED METHODS

CROSS REFERENCE TO RELATED APPLICATION

This application claims benefit of U.S. Provisional Application Ser. No. 62/180,804 entitled, "Planting Apparatus, System, and Related Methods" filed Jun. 17, 2015, the entire disclosure of which is incorporated herein by reference.

FIELD OF THE DISCLOSURE

The present disclosure is generally related to growing plants and vegetation and more particularly is related to a planting apparatus, system and related methods.

BACKGROUND OF THE DISCLOSURE

Within the field of gardening and the cultivation of plants and vegetation, it is usually necessary to begin growing and cultivation of a plant from a seed form. Commonly, the seed is placed in a small container and given the appropriate amount of water until it reaches a certain size. Then, the small plant is transplanted or repotted into a larger pot for further growing. Again, once the plant reaches a certain size, it may be repotted again into a still larger pot or into the ground. This process can be cumbersome and time consuming due to the requirement that the plant needs to be successively repotted and the need for a variety of differently-sized pots. Further, repotting of the plant can disrupt the root system of the plant which can present negative growing conditions, such as a weak root system.

Furthermore, the ability to provide the seed or plant with the proper amount of water can often be more challenging than expected. The conventional method of adding water to the surface of the soil usually results in under-watering or over-watering of the plant. While some devices for planting using a wick to draw water to the seed or plant can help remedy the over or under watering problem with plants, these devices are limited in their size and their ability to be used with plants of varying sizes. Also, these devices can often require specialized components, such as seed-germinating wafers or similar items to allow the seed to grow.

Thus, a heretofore unaddressed need exists in the industry to address the aforementioned deficiencies and inadequacies.

SUMMARY OF THE DISCLOSURE

Embodiments of the present disclosure provide an apparatus, system, and method for planting and transplanting vegetation, i.e., seeds and plants. Briefly described, in architecture, one embodiment of the planting apparatus, among others, can be implemented as follows. The planting apparatus includes a first container holding a quantity of liquid. A second container is positioned above the first container, the second container having a hole positioned in a lower portion thereof. A filter container is positioned on the second container, the filter container having at least one of: a seed and a plant. A wicking material is positioned between the filter container and the second container, through the hole in the lower portion of the second container, and into the first container, wherein the wicking material is in contact with the quantity of liquid.

The present disclosure can also be viewed as a planting apparatus. Briefly described, in architecture, one embodiment of the apparatus, among others, can be implemented as follows. A planting apparatus has a first container capable of holding a quantity of liquid. A second container is positioned above the first container, the second container having a hole positioned in a lower portion thereof. A biodegradable container is positioned at least partially in the second container, the biodegradable container is sized to receive at least one of: a seed and a plant. A wicking material is positionable between the biodegradable container and the second container, through the hole in the lower portion of the second container, and into the first container, wherein the wicking material is contactable with the quantity of liquid.

The present disclosure can also be viewed as providing a method of growing a vegetation product. In this regard, one embodiment of such a method, among others, can be broadly summarized by the following steps: placing a quantity of liquid in a first container; positioning a second container above the first container, wherein the second container has a hole positioned in a lower portion thereof; positioning a filter container on the second container; placing a wicking material between the filter container and the second container, through the hole in the lower portion of the second container; placing at least one of: a seed and a plant in the filter container; and transferring a portion of the quantity of liquid from the first container to the filter container through the wicking material.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
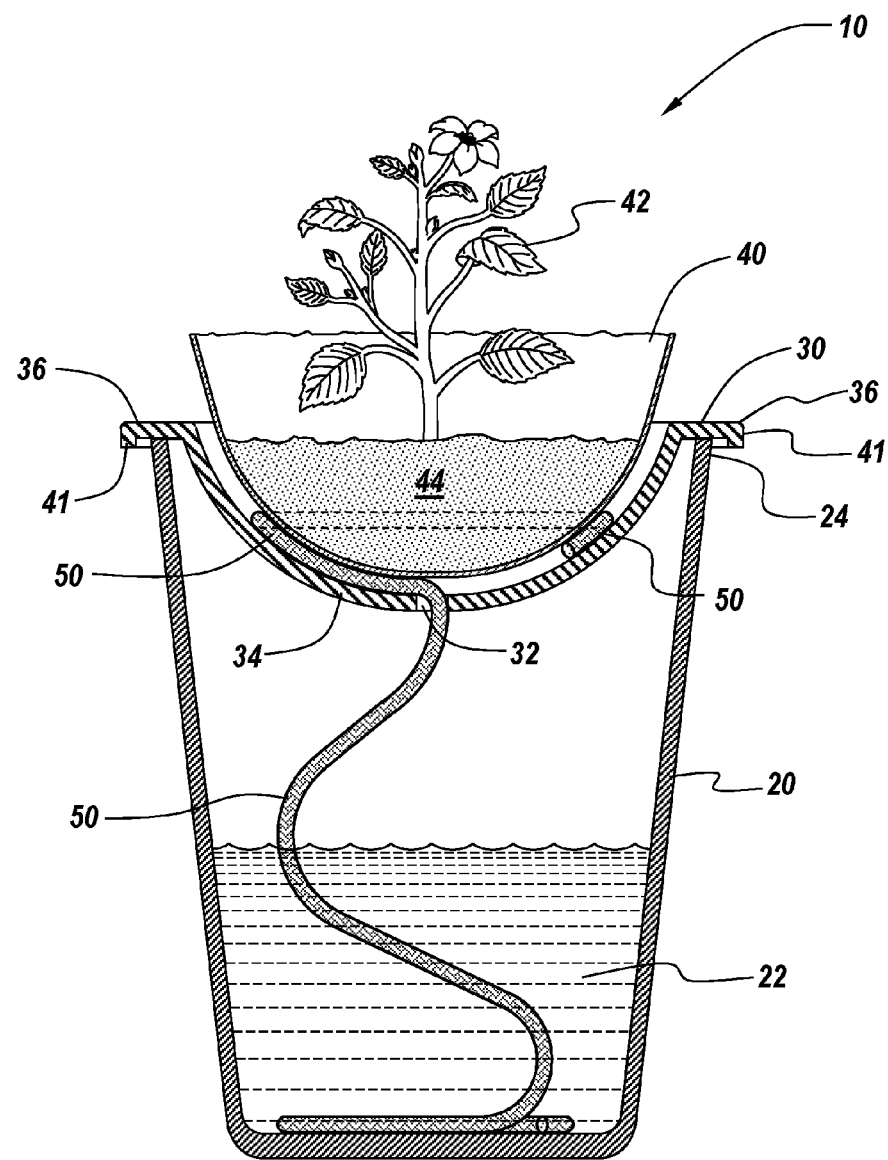
FIG. 1 is a cross-sectional illustration of a planting apparatus, in accordance with a first exemplary embodiment of the present disclosure.

FIG. 1 is a cross-sectional illustration of a planting apparatus 10, in accordance with a first exemplary embodiment of the present disclosure. The planting apparatus 10, which may be referred to herein simply as 'apparatus 10' has a first container 20 holding a quantity of liquid 22. A second container 30 is positioned above the first container 20. The second container 30 has a hole 32 positioned in a lower portion 34 thereof. A filter container 40 is positioned at least partially in the second container 30, wherein the filter container 40 has at least one of: a seed and a plant 42. A wicking material 50 is positioned between the filter container 40 and the second container 30, through the hole 32 in the lower portion 34 of the second container 30, and into the first container 20, wherein the wicking material 50 is in contact with the quantity of liquid 22.

The apparatus 10 may be used with planting and cultivating vegetation of various kinds, including vegetables, flowers, or other types of vegetation. The apparatus 10 may be particularly beneficial in initially growing a plant from a seed and allowing that plant to develop a sufficient root system before it is finally transplanted into a garden. Unlike conventional systems which only support a plant to a particular size, and thus require the plant to continually be transplanted between various-sized devices, the apparatus 10 may allow for a one-step planting.

The apparatus 10 is formed from a first container 20 which is positioned at a bottom of the apparatus 10. The first container 20 holds a quantity of water or similar growing fluid, including nutrient-infused or enhanced plant-food liquid. The first container 20 has an opening at a top side thereof which the second container 30 can be positioned over. The second container 30 may be a bowl-shaped or semi-hemispherical shape, such that the lower portion 34 of the second container 30 may be positioned below a top edge 24 of the first container 20 when the second container 30 is positioned on the first container 20. The hole 32 is formed in the lower portion 34 of the second container. The edges of the second container 30 may include a tab 36 or similar feature which extends laterally from the second container 30 and interfaces with the top edge 24 of the first container 20, or a position along the first container 20 which is proximate to the top edge 24. The tab 36 may prevent the second container 30 from falling into the first container 20. The tab 36 may include a descending portion 41 which extends below the lip 24 of the first container 20.

A filter container 40 or structure may be preferably made from a biodegradable material may be positioned within the bowl-shape of the second container 30. For example, a common filter container 40 may include a cellulose-based filter product such as a coffee filter, which will break down due to natural conditions after a given period of time. However, in some designs, the filer container 40 may be constructed from non-biodegradable materials. A quantity of soil 44 may be positioned within the filter container 40 and a seed, seedling, or plant 42 may be grounded into the quantity of soil 44. The filter container 40 may support the quantity of soil 44 and the plant 42 within the bowl-shape of the second container 30 for a given period of time until the filter container 40 biodegrades into the soil 44, when a biodegradable material is used. It is noted that the soil 44 may include potting soil or any growing medium.

The wicking material 50 is interfaced from a position between the filter container 40 and the second container 30, e.g., under the filter container 40 but above the inner wall of the bowl-shaped second container 30, through the hole 32 in the lower portion 34 of the second container 30, and into the first container 20. The wicking material 50 may be formed from a variety of different materials capable of wicking water or liquid from the first container 20 to the second container 30, such that the water or liquid can be provided to the plant 42 in the soil 44. For example, the wicking material 50 may be a length of fibrous, natural rope, such as cotton, or another material. After a given period of time, the wicking material 50 may draw the liquid 22 from the first container 20 through the hole 32 and to the soil 44. It is noted that the wicking material 50 should be positioned in a manner than ensures it provides adequate coverage to the soil 44 and receives adequate contact with the liquid 22. For example, the wicking material 50 may be coiled within the bottom of the first container 20 in contact with the liquid 22, positioned through the hole 32, and coiled along the inner wall of the bowl-shaped second container 30. In this position, the upper part of the wicking material 50 may contact the soil 44 through the filter container 40 along an extended radial portion of the filter container 40, e.g., about an entire circumference of the hole 32. It may be necessary for the portion of the wicking material 50 positioned in the second container 30 to be fully covered by the soil 44 therein to prevent ambient drying of the wicking material 50.

Figure 2:
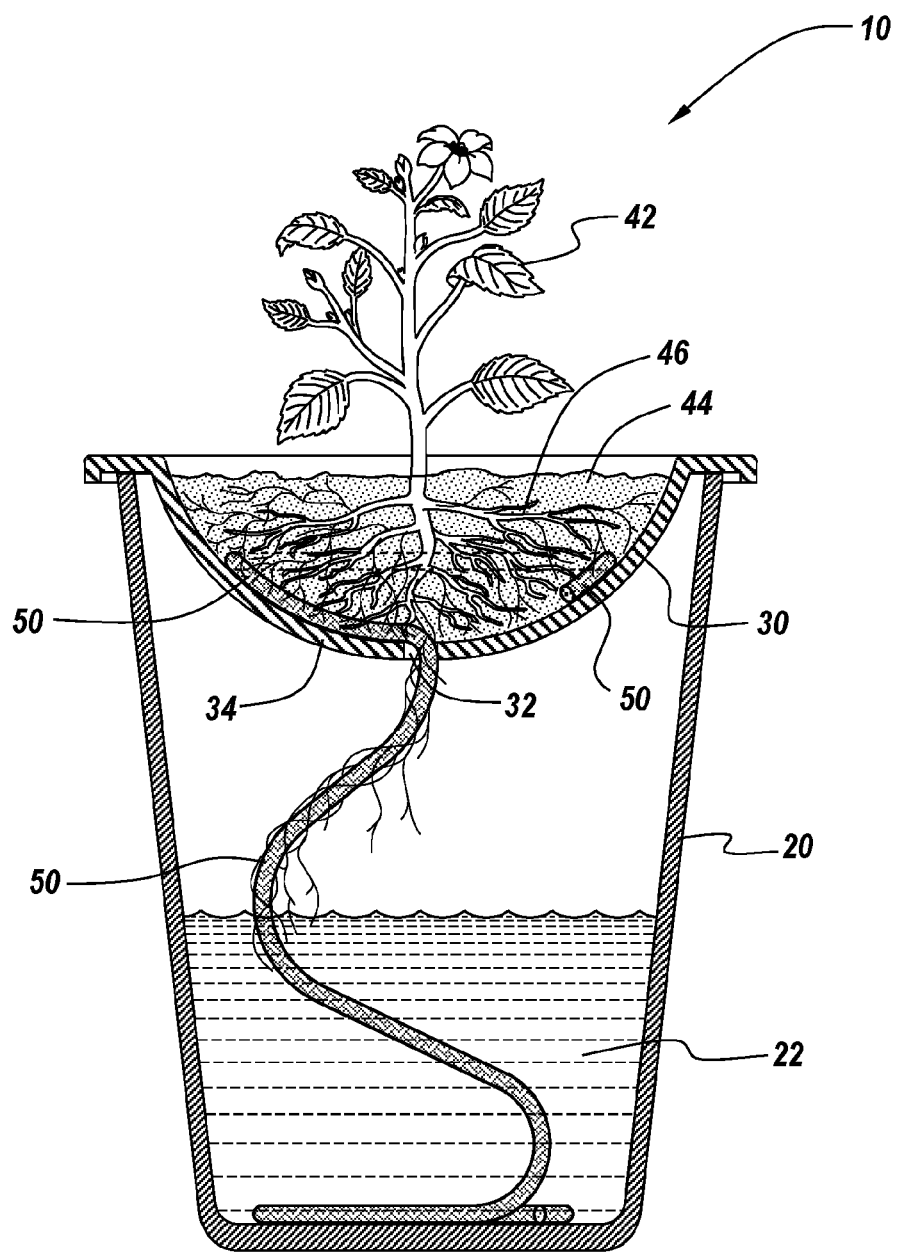
FIG. 2 is a cross-sectional illustration of the planting apparatus of FIG. 1 with a developed root system, in accordance with the first exemplary embodiment of the present disclosure.

FIG. 2 is a cross-sectional illustration of the planting apparatus 10 of FIG. 1 with a developed root system, in accordance with the first exemplary embodiment of the present disclosure. After the plant 42 has been positioned within the apparatus 10 for a given period of time, usually a week or two, the filter container 40 will biodegrade enough to allow the soil 44 to generally encompass the bowl-shaped part of the second container 30. At the same time, the plant 42 will develop a root system 46 which fills out the soil 44 and descends through the hole 32 along the wicking material 50. The root system 46 may intertwine with the wicking material 50 and eventually descend far enough into the first container 20 to contact the liquid 22. To allow for the root system 46 to develop and move between the second container 30 to the first container 20, the hole 32 should be sized adequately. For example, the hole 32 may be 1 inch or larger in diameter for certain plants, although other sizes are envisioned. After the root system 46 has developed sufficiently and the plant 42 is ready for final planting in an in-ground garden or similar setting, the root system 46 bundled with the soil 44 may be removed from the second container 30 and the root system 46 may be pulled through the hole 32 without damage to it. The root system 46 bundled with the soil 44 and the root system 46 interfaced with the wicking material 50 may then be planted elsewhere.

Figure 3:
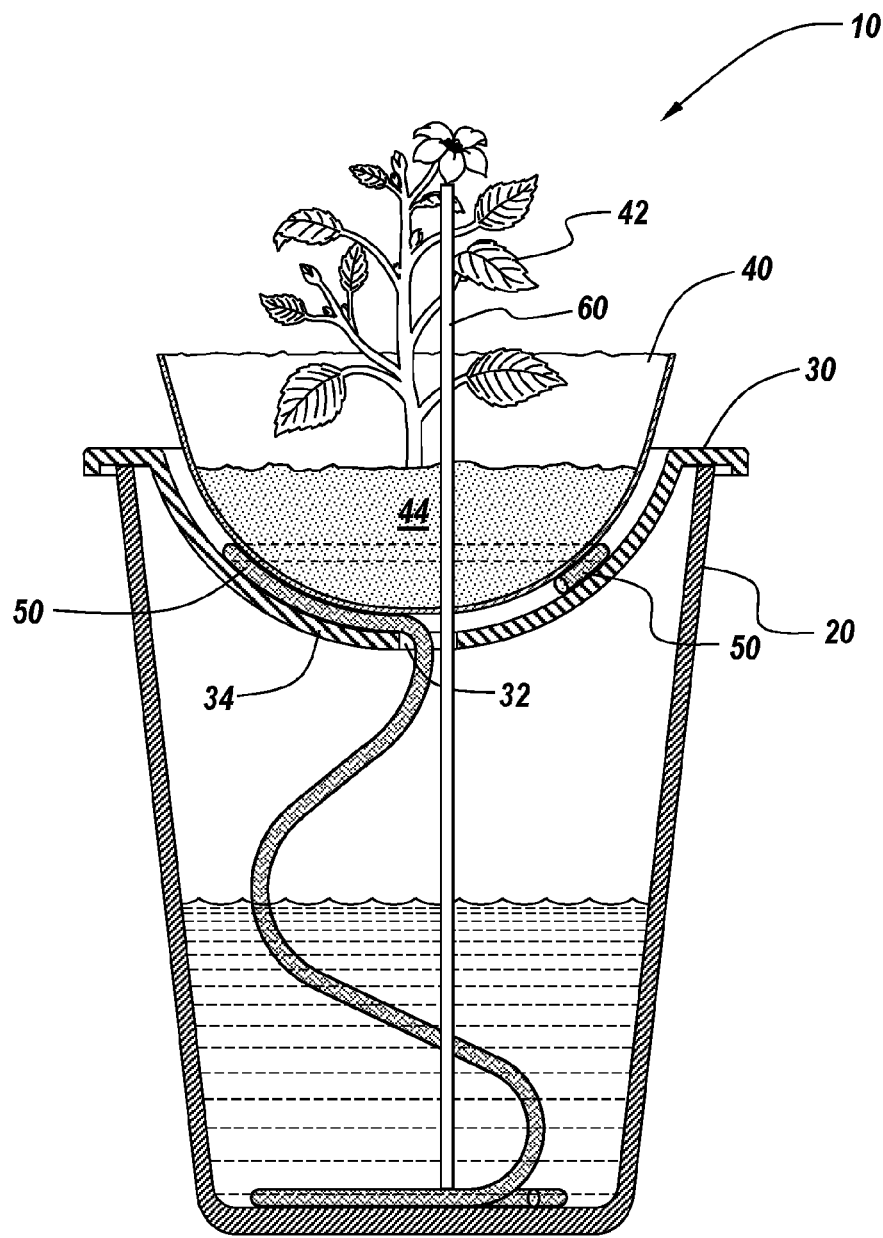
FIG. 3 is a cross-sectional illustration of the planting apparatus of FIG. 1 with a supporting stake, in accordance with the first exemplary embodiment of the present disclosure.

FIG. 3 is a cross-sectional illustration of the planting apparatus 10 of FIG. 1 with a supporting stake 60, in accordance with the first exemplary embodiment of the present disclosure. As is shown in FIG. 3, the plant 42 may require or benefit from the use of a supporting stake 60 which is positioned substantially vertical within the first and second containers 20, 30. The supporting stake 60 may include a rigid material which can assume a substantially upright position to allow the plant 42 to connect to as it grows. The supporting stake 60 can be constructed from wood, metal, or another material and may be positioned through the hole 32 of the second container 30. The supporting stake 60 may be passed through the filter container 40 or be positioned through the soil 44 after the filter container 40 has biodegraded.

Figure 4A:
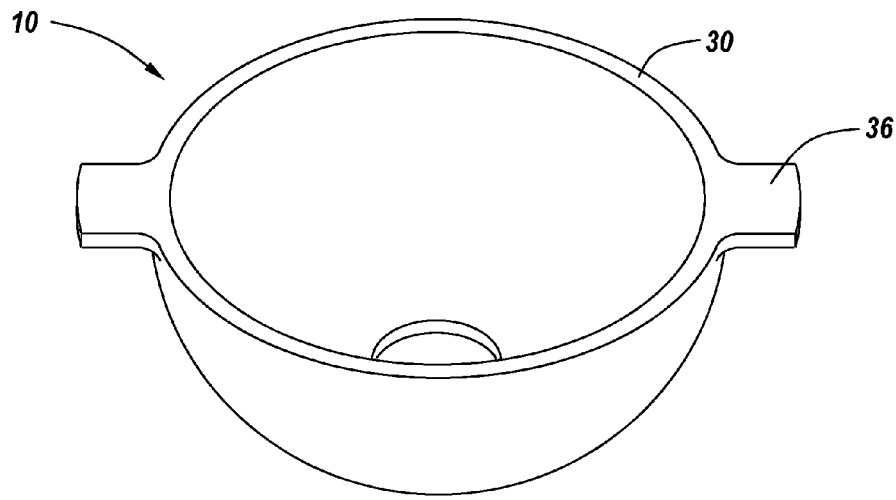
FIGS. 4A-4C are various illustrations of the planting apparatus of FIG. 1 with various connection systems between the first and second containers, in accordance with the first exemplary embodiment of the present disclosure.
Figure 4B:
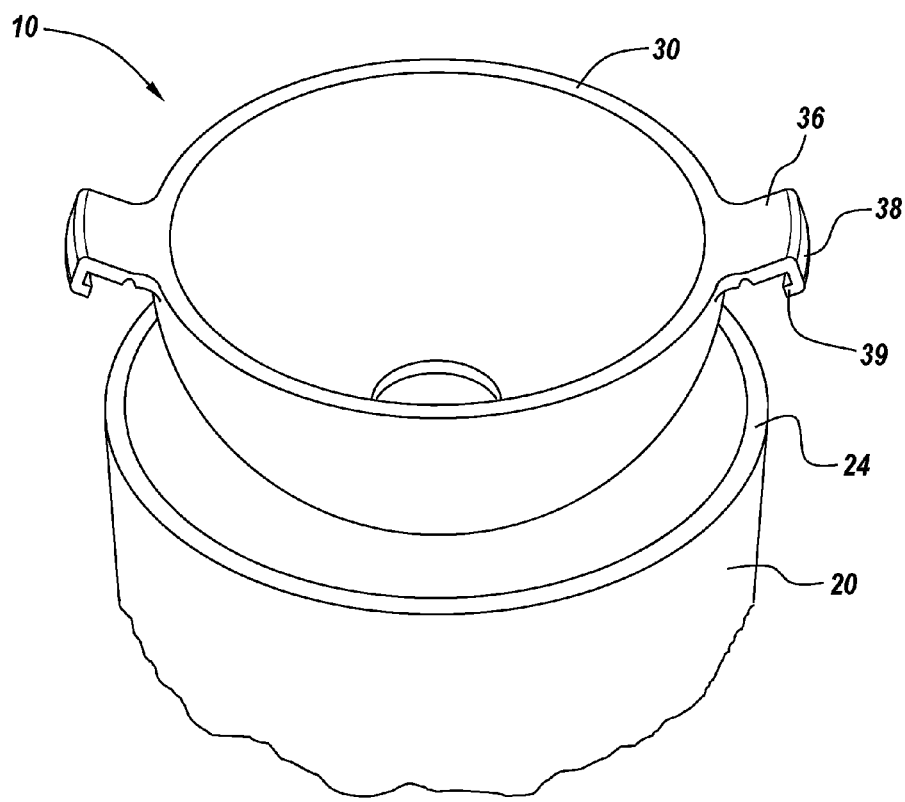
Figure 4C:
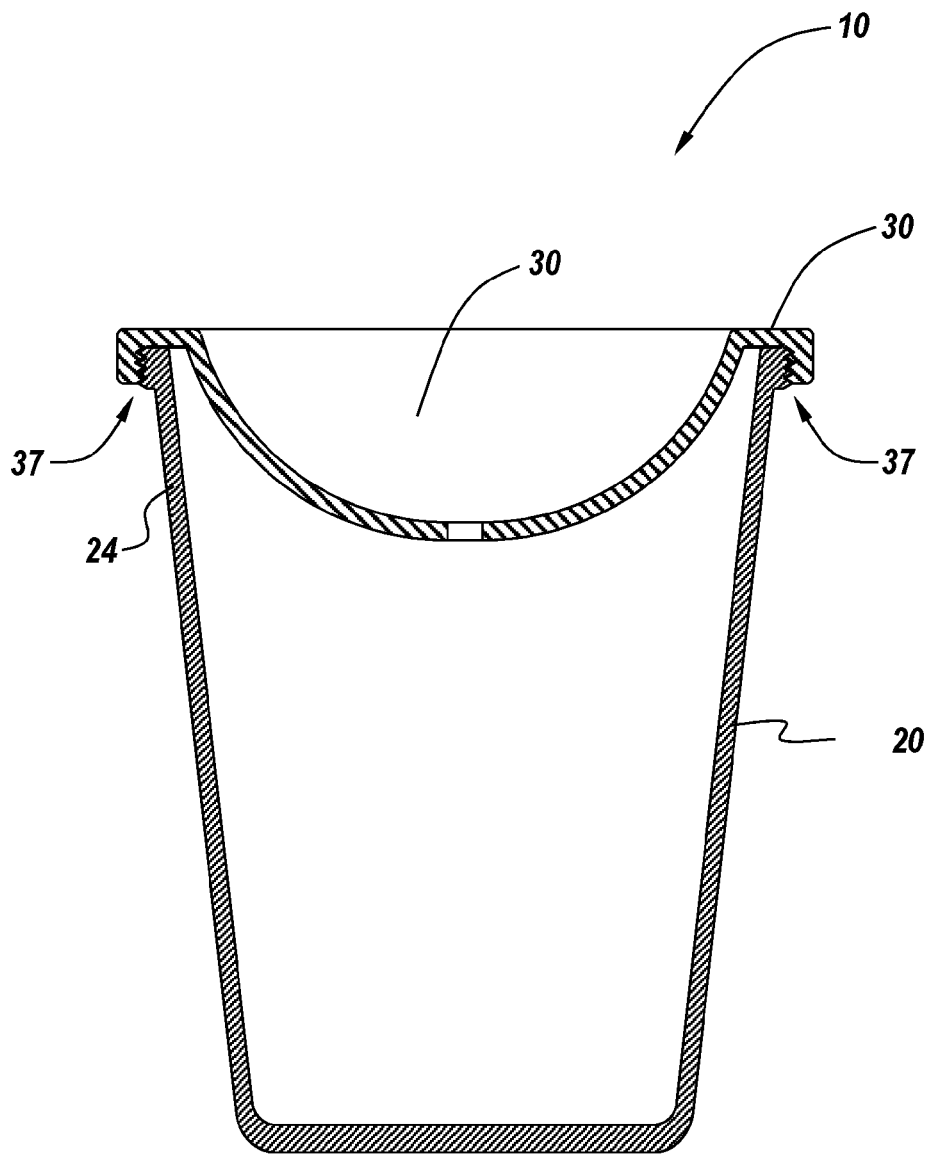

FIGS. 4A-4C are various illustrations of the planting apparatus 10 of FIG. 1 with various connection systems between the first and second containers 20, 30, in accordance with the first exemplary embodiment of the present disclosure. In FIG. 4A, the second container 30 is shown with the tabs 36 positioned on either side of the second container 30. The tabs 36 may extend laterally a sufficient distance to be sized larger than an opening of the first container. Any number or shape of the tabs 36 may be utilized. In FIG. 4B, the second container 30 is shown with a tab system 36 that utilizes a snap or connector design. In this design, the tabs 36 have a flexing portion 38 with a lock 39 which can frictionally engage with a top edge 24 or other top feature of the first container 20. The flexing portion 38 with lock 39 can retain the second container 30 to the first container 20. In FIG. 4C, the apparatus 10 employs a threaded or screw-on design 37 for use with the tabs, where the second container 30 can be screwed on to the top edge 24 of the first container 20. A variety of other designs, not explicitly mentioned herein, may also be used with the apparatus 10, all of which are considered within the scope of the present disclosure.

Figure 5:
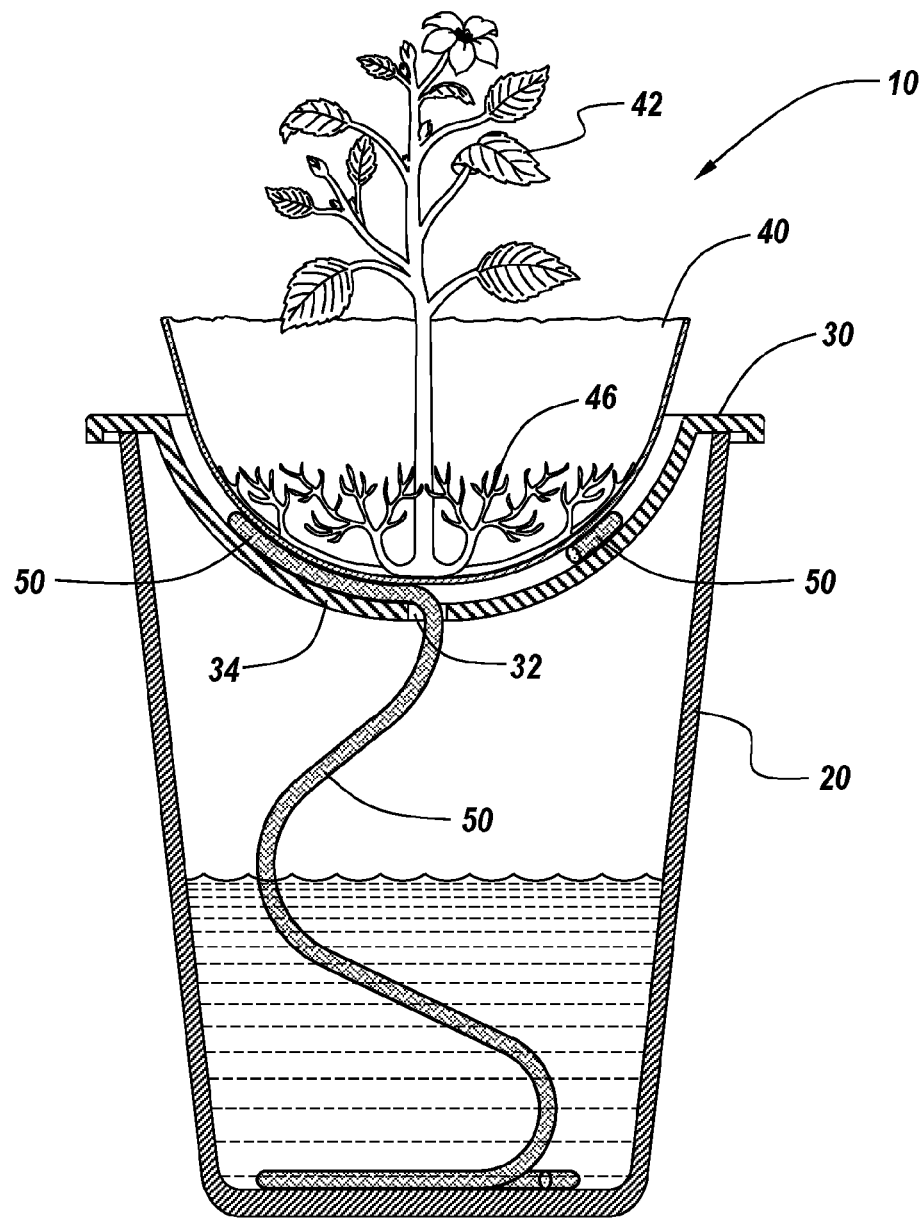
FIG. 5 is a cross-sectional illustration of the planting apparatus of FIG. 1 in hydroponic use, in accordance with the first exemplary embodiment of the present disclosure.

FIG. 5 is a cross-sectional illustration of the planting apparatus 10 of FIG. 1 in hydroponic use, in accordance with the first exemplary embodiment of the present disclosure. The apparatus 10 of FIG. 5 may be substantially similar to the apparatus 10 illustrated in FIGS. 1-4C with the exception that it may grow the plant 42 without the use of soil, i.e., hydroponically. In this use, the root system 46 of the plant 42 may develop with the filter container 40 or another material which is positioned in the second container 30.

It is noted that while hydroponic use of the apparatus 10 may be used, use of the soil may provide heightened support to the plant 42 and its root system 46, it may provide fertility to the plant 42 without constant attention to hydroponic balances, and it does not require pumps, waterlines, or similar items which may be required by hydroponic growing operations. Further, plants growing in a soil medium, including perlite, potting soil, or a similar medium, will develop a root system that differs from the root system that will develop when grown in hydroponic conditions using a liquid solution, usually composed of water and nutrients. For example, roots that grow in hydroponic conditions, known as 'water roots' often seem to be more brittle than soil-grown roots and are usually not recommended to be transplanted into a soil medium. Consequently, moving a plant from a soil growing condition to a hydroponic soil condition, or vise-versa, can result in setbacks in the root system. The subject apparatus 10 may help alleviate the problem of transplanting between the soil and hydroponic mediums because the apparatus 10 encourages growth in either soil or hydroponic mediums, therefore creating a less stressful planting from the apparatus 10 using a hydronic medium to a large pot or to the garden.

Figure 6:
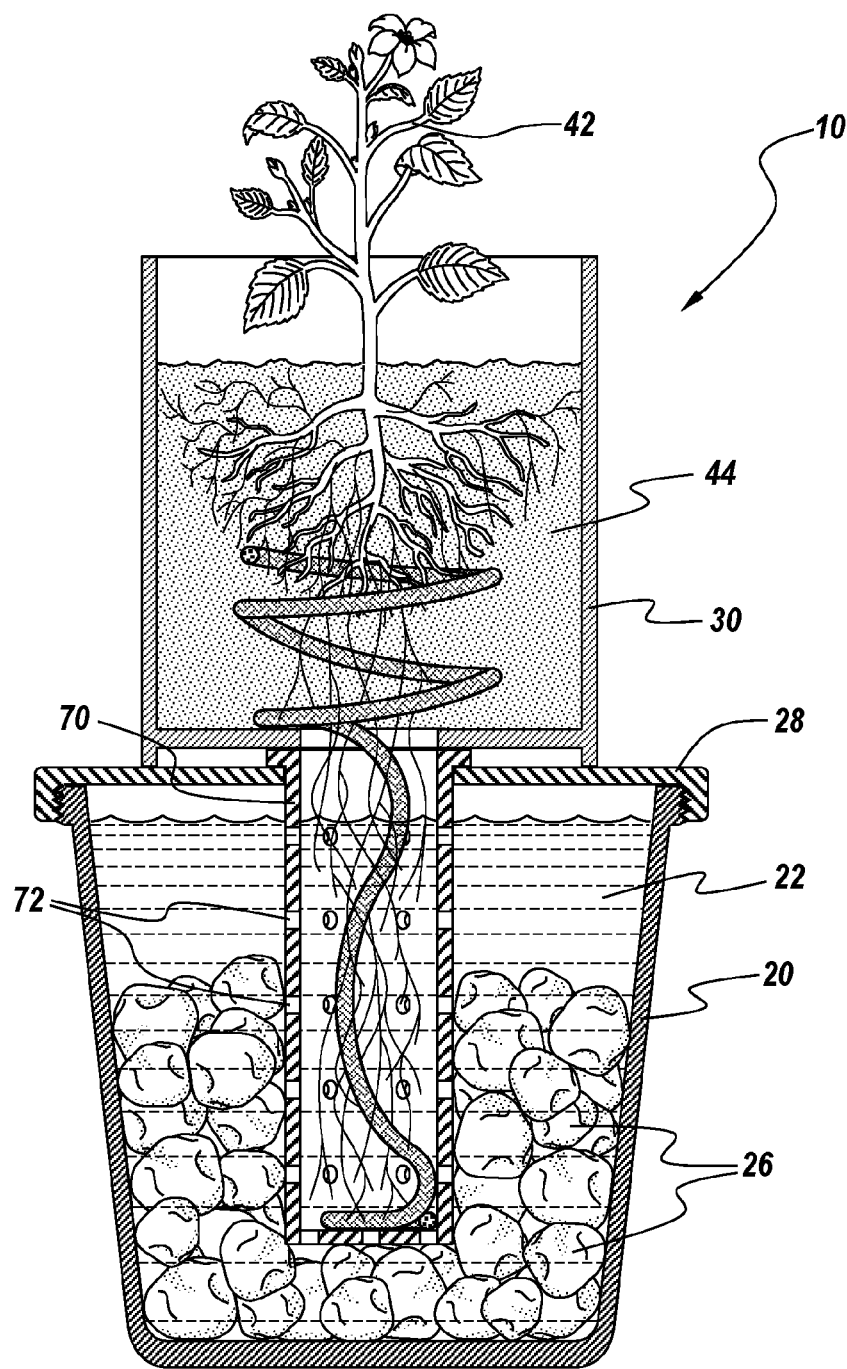
FIG. 6 is a cross-sectional illustration of the planting apparatus of FIG. 1, in accordance with the first exemplary embodiment of the present disclosure.

FIG. 6 is a cross-sectional illustration of the planting apparatus 10 of FIG. 1, in accordance with the first exemplary embodiment of the present disclosure. As is shown in FIG. 6, a tube 70 may be used to assist with retaining the root system 46 of the plant 42 during growing. The tube 70 may extend from an underside of the second container 30 and descend into the first container 20. A plurality of holes 72 within the tube 70 may allow water 22 within the first container 20 to contact the root system 46 and the wicking material 50. Thus, the root system 46 may develop within the soil 44 and within the tube 70. Stones, pebbles, rocks, marbles, or other items 26 may be positioned within the first container 20 within the water to assist with root development. In this design, the first container 20 may include a cover 28 on which the second container 30 sits. The cover 28 may also provide an attachment point for the tube 70.

Figure 7:
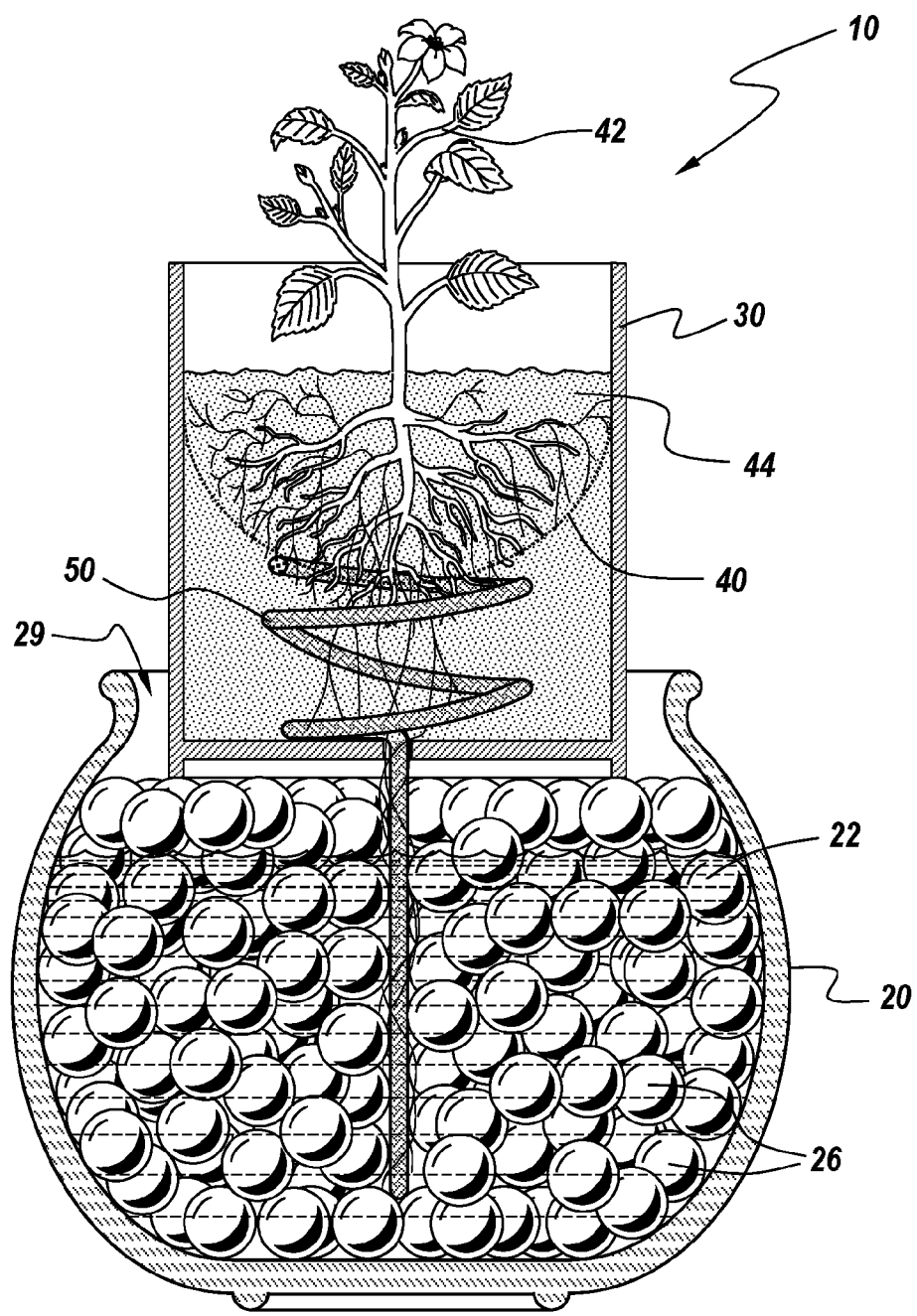
FIG. 7 is a cross-sectional illustration of the planting apparatus of FIG. 1, in accordance with the first exemplary embodiment of the present disclosure.

FIG. 7 is a cross-sectional illustration of the planting apparatus of FIG. 1, in accordance with the first exemplary embodiment of the present disclosure. As shown, the first container 20 may be provided with a wide mouth or opening 29 and may be filled with stones, pebbles, rocks, marbles, or other materials 26. The second container 30 may have a base portion that is smaller than the opening 29 of the first container 20, such that the base portion of the second container 30 can be received within the opening 29. The base portion of the second container 30 may be placed in contact with the stones, pebbles, rocks, marbles or other items 26, which may act to support the weight of the second container 30. Similar to as described previously, the wicking material 50 may be positioned between the first and second containers 20, 30, within the soil 44 and the water 22, to allow for root development of the plant 42. In this design, the second container 30 may include a conventional growing pot.

With regards to all figures of this disclosure, the apparatus 10 may include a number of additional features. For example, the first container may be provided with a waterline level marking or similar identification to assist with providing the correct quantity of liquid within the first container. The first and second containers may be constructed in a variety of shapes and sizes, including with cylindrical shapes or square shapes, among others. Additionally, it is noted that while the apparatus 10 may be used for full plant growing operations, it is possible to harvest part of the root system of plants during growth of the plant or harvest portions of the plant itself to initiate new plantings. Further, when the apparatus is sold, it may be sold as a kit that includes any combination of soil, seeds, or seedling plants. Furthermore, it is noted that the apparatus and system described herein may be used with an expansion ring which interfaces between the second container and the first container when the opening of the first container is sized larger than a diameter of the second container. For example, the expansion ring may be a rigid structure which has a hole in a center thereof for receiving the second container and may allow differently-sized second containers to sit correctly on the first container (or a large pot, vase, or other vessel) without the need to consistently match the sizes of the first and second containers.

Figure 8:
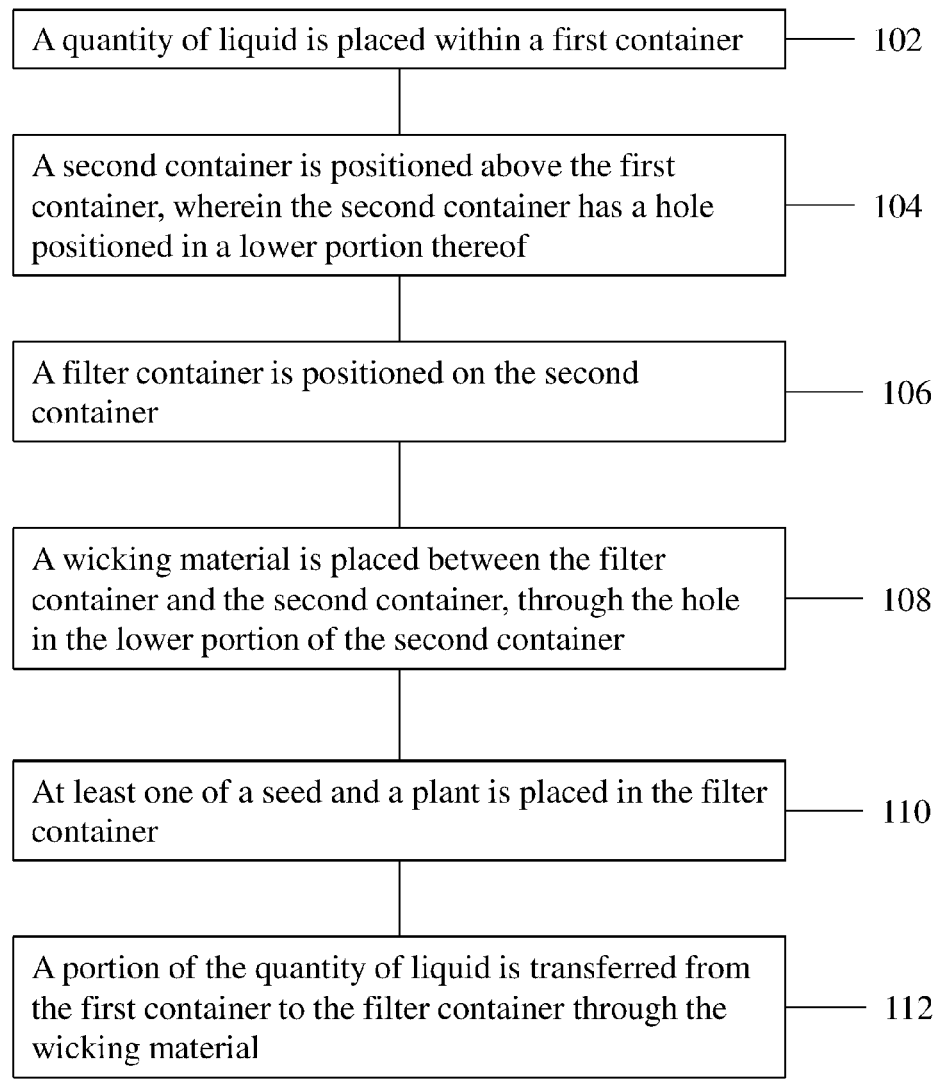
FIG. 8 is a flowchart illustrating a method of growing a vegetation product, in accordance with the first exemplary embodiment of the present disclosure.

FIG. 8 is a flowchart 200 illustrating a method of growing a vegetation product, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a quantity of liquid is placed within a first container. A second container is positioned above the first container, wherein the second container has a hole positioned in a lower portion thereof (block 104). A filter container is positioned on the second container (block 106). A wicking material is placed between the filter container and the second container, through the hole in the lower portion of the second container (block 108). At least one of a seed and a plant is placed in the filter container (block 110). A portion of the quantity of liquid is transferred from the first container to the filter container through the wicking material (block 112).

The method may further include any number of steps, processes, structures, and functions, including any disclosed relative to the figures herein. For example, the method may include growing the root system of the at least one of the seed and the plant, thereby allowing the root system to intertwine with the wicking material. Once developed to a predetermined degree, the plant may be transferred to a different setting, such as a planting device or the ground soil. In developing the root system, it may be at least partially contained within a tube extending from the second container into the first container through the hole, wherein the tube has a plurality of holes positioned within a sidewall thereof, wherein the wicking material is positioned within the tube.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment of the disclosure without departing substantially from the spirit and principles of the disclosure. All such modifications and variations are intended to be included herein within the scope of the present disclosure.

What is claimed is:

1. A planting apparatus comprising:
   a first container holding a quantity of liquid;
   a second container positioned above the first container, the second container having a hole positioned in a lower portion thereof;
   a filter container positioned on the second container, the filter container having at least one of: a seed and a plant; and
   a wicking material positioned between the filter container and the second container, through the hole in the lower portion of the second container, and into the first container, wherein the wicking material is in contact with the quantity of liquid in the first container and wherein the wicking material is positioned in contact with the second container about an entire circumference of the hole.

2. The planting apparatus of claim 1, wherein the filter container holds a quantity of soil.

3. The planting apparatus of claim 1, wherein the second container has a curved lower portion, wherein the curved lower portion is positioned at least partially below a top rim of the first container.

4. The planting apparatus of claim 3, wherein the wicking material is positioned in at least a partial coil within the curved lower portion.

5. The planting apparatus of claim 1, wherein the first container has at least one tab extending off a top rim thereof.

6. The planting apparatus of claim 5, wherein the at least one tab has a descending portion, wherein the descending portion extends towards a base of the first container.

7. The planting apparatus of claim 5, wherein the at least one tab further comprises at least two tabs positioned spaced on a rim of the second container.

8. The planting apparatus of claim 7, wherein the at least two tabs further include a flexing portion and a lock portion, wherein the lock portion is engagable with the first container.

9. The planting apparatus of claim 8, wherein the lock portion is engagable with the first container through threads on the lock portion engaging with threads on the first container.

10. The planting apparatus of claim 1, wherein the wicking material further comprises a length of fibrous material.

11. The planting apparatus of claim 1, further comprising a support stake positioned between the first and second containers, wherein the support stake is positioned through the hole.

12. The planting apparatus of claim 1, wherein the at least one of the seed and the plant is in direct contact with the filter container without soil.

13. The planting apparatus of claim 1, further comprising at least one of pebbles and marbles positioned within the first container.

14. The planting apparatus of claim 13, wherein the first container sits on the at least one of pebbles and marbles within the first container.

15. The planting apparatus of claim 1, further comprising a tube extending from the second container into the first container through the hole, wherein the tube has a plurality of holes positioned within a sidewall thereof, wherein the wicking material is positioned within the tube.

16. A planting apparatus comprising:
    a first container capable of holding a quantity of liquid;
    a second container positioned above the first container, the second container having a hole positioned in a lower portion thereof;
    a biodegradable container positioned at least partially in the second container, the biodegradable container is sized to receive at least one of: a seed and a plant; and
    a wicking material positionable between the biodegradable container and the second container, through the hole in the lower portion of the second container, and into the first container, wherein the wicking material is contactable with the quantity of liquid.

17. A method of growing a vegetation product, the method comprising:
    placing a quantity of liquid in a first container;
    positioning a second container above the first container, wherein the second container has a hole positioned in a lower portion thereof;
    positioning a filter container on the second container;
    placing a wicking material between the filter container and the second container, through the hole in the lower portion of the second container, wherein the wicking material is positioned in contact with the second container about an entire circumference of the hole;
    placing at least one of: a seed and a plant in the filter container; and
    transferring a portion of the quantity of liquid from the first container to the filter container through the wicking material.

18. The method of claim 17, further comprising growing a root system of the at least one of the seed and the plant, thereby allowing the root system to intertwine with the wicking material.

19. The method of claim 18, wherein the root system is at least partially contained within a tube extending from the second container into the first container through the hole, wherein the tube has a plurality of holes positioned within a sidewall thereof, wherein the wicking material is positioned within the tube.

\* \* \* \* \*